United States Patent [19]

Arakawa et al.

[11] Patent Number: 4,910,407

[45] Date of Patent: Mar. 20, 1990

[54] RADIATION IMAGE STORAGE PANEL

[75] Inventors: Satoshi Arakawa; Junji Miyahara, both of Kaisei, Japan

[73] Assignee: Fuji Photo Film Co., Ltd., Kanagawa, Japan

[21] Appl. No.: 226,549

[22] Filed: Jul. 29, 1988

Related U.S. Application Data

[63] Continuation of Ser. No. 27,139, Mar. 16, 1987, abandoned, which is a continuation of Ser. No. 568,416, Jan. 5, 1984, abandoned.

[51] Int. Cl.[4] ........................ H05B 33/00; G02F 1/00; B29B 1/16

[52] U.S. Cl. ................................ 250/484.1; 252/583; 156/231; 428/913; 428/914

[58] Field of Search ............... 250/307.2, 327.1, 483.1, 250/484.1 R, 484.1 B, 486.1, 487.1; 428/610, 642, 688, 900, 913, 914; 252/583, 584; 156/230, 231, 249, 306.3; 427/160, 369

[56] References Cited

U.S. PATENT DOCUMENTS

| | | | |
|---|---|---|---|
| 4,011,455 | 3/1977 | Waller et al. | 250/486.1 |
| 4,163,823 | 8/1979 | Legras et al. | 428/900 |
| 4,239,968 | 12/1980 | Kotera et al. | 250/327.1 |
| 4,246,485 | 1/1981 | Bossomaier et al. | 250/486.1 |
| 4,298,650 | 11/1981 | Lu | 428/306 |

FOREIGN PATENT DOCUMENTS

| | | | |
|---|---|---|---|
| 0092241 | 10/1983 | European Pat. Off. | 250/486.1 |

*Primary Examiner*—Michael W. Ball
*Assistant Examiner*—Louis Falasco
*Attorney, Agent, or Firm*—Sixbey, Friedman, Leedom & Ferguson

[57] ABSTRACT

A radiation image storage panel comprising a support and a stimulable phosphor-containing resin layer provided thereon, in which the void ratio of said stimulable phosphor-containing resin layer is reduced in comparison with an ordinarily prepared stimulable phosphor-containing resin layer having the same binder-phosphor ratio and formed by a coating procedure conducted under an atmospheric pressure.

The void ratio is not more than 85% of the void ratio of the ordinarily prepared stimulable phosphor-containing resin layer in which a resinous binder and a stimulable phosphor are contained in a weight ratio of 1:1 to 1:25, the ratio of 1:25 being exclusive, and the void ratio is not more than 90% for a stimulable phosphor-containing resin layer in which a resinous binder and a stimulable phosphor are contained in a weight ratio of 1:25 to 1:100.

20 Claims, 2 Drawing Sheets

RADIATION IMAGE STORAGE PANEL

This application is a continuation of Ser. No. 027,139, filed 3/16/87, now abandoned, which itself was a continuation application of U.S. Ser. No. 568,416, filed 1/5/84, now abandoned.

BACKGROUND OF THE INVENTION

1. Field of the Invention

This invention relates to a radiation image storage panel and a process for the preparation of the same. More particularly, this invention relates to a radiation image storage panel comprising a support and a phosphorcontaining resin layer provided thereon in which a resinous binder and a stimulable phosphor are contained in a weight ratio of 1:1 to 1:100, and a process for the preparation of the same.

2. Description of Prior Arts

For obtaining a radiation image, there has been conventionally employed a radiography utilizing a combination of a radiographic film having an emulsion layer containing a photosensitive silver salt material and a radiographic intensifying screen.

As a method replacing the above-described radiography, a radiation image recording and reproducing method utilizing a stimulable phosphor as described, for instance, in U.S. Pat. No. 4,239,968, has been recently paid much attention. In the radiation image recording and reproducing method, a radiation image storage panel comprising a stimulable phosphor (stimulable phosphor sheet) is used, and the method involves steps of causing the stimulable phosphor of the panel to absorb radiation energy having passed through an object or having been radiated by an object; exciting the stimulable phosphor with an electromagnetic wave such as visible light and infrared rays (hereinafter referred to as "stimulating rays") to sequentially release the radiation energy stored in the stimulable phosphor as light emission; photo-electrically processing the emitted light to give electric signals; and reproducing the electric signals as a visible image on a recording material such as a photosensitive film or on a displaying device such as CRT.

In the above-described radiation image recording and reproducing method, a radiation image can be obtained with a sufficient amount of information by applying a radiation to the object at considerably smaller dose, as compared with the case of using the conventional radiography. Accordingly, this radiation image recording and reproducing method is of great value especially when the method is used for medical diagnosis.

The radiation image storage panel employed in the above-described radiation image recording and reproducing method has a basic structure comprising a support and a stimulable phosphor-containing resin layer provided on one surface of the support. Further, a transparent film is generally provided on the free surface (surface not facing the support) of the stimulable phosphor-containing resin layer to keep the stimulable phosphor-containing resin layer from chemical deterioration or physical shock.

The stimulable phosphor-containing resin layer comprises a resinous binder and stimulable phosphor particles dispersed therein. The stimulable phosphor-containing resin layer is generally provided on a support under an atmospheric pressure utilizing the following coating procedure.

The stimulable phosphor particles and the resinous binder are mixed in an appropriate solvent to prepare a coating dispersion. The coating dispersion is directly applied onto a surface of a support for a radiation image storage panel under an atmospheric pressure using a doctor blade, a roll coater, a knife coater or the like, and the solvent contained in the coating dispersion applied is removed to form a stimulable phosphor-containing resin layer. Alternatively, the stimulable phosphor-containing resin layer is provided on the support by applying the coating dispersion onto a false support such as a glass plate under an atmospheric pressure, removing the solvent from the coating dispersion to form a phosphor-containing resin film, separating the film from the false support, and then causing the film to adhere to the genuine support.

When excited with stimulating rays after having been exposed to a radiation such as X-rays, the stimulable phosphor particles contained in the stimulable phosphor-containing resin layer emit light (stimulated emission). Accordingly, the radiation having passed through an object or having been radiated by an object is absorbed by the stimulable phosphor-containing resin layer of the radiation image storage panel in proportion to the applied radiation dose, and a radiation image of the object is produced in the radiation image storage panel in the form of a radiation energy-stored image (latent image). The radiation energy-stored image can be released as stimulated emission (light emission) by applying stimulating rays to the panel, for instance by scanning the panel with stimulating rays. The stimulated emission is then photo-electrically converted to electric signals, so as to produce a visible image from the radiation energy-stored image.

It is desired for the radiation image storage panel employed in the radiation image recording and reproducing method to have a high sensitivity and to provide an image of high quality (high sharpness, high graininess, etc.). In particular, from the viewpoint of obtaining more accurate and detailed information of an object, it is desired to develop a radiation image storage panel which provide an image of improved sharpness.

SUMMARY OF THE INVENTION

Accordingly, an object of the present invention is to provide a radiation image storage panel particularly improved in the sharpness of the image provided therby, and a process for the preparation of the same.

There is provided by the present invention a radiation image storage panel comprising a support and a stimulable phosphor-containing resin layer provided thereon which contains a resinous binder and a stimulable phosphor in a weight ratio of 1:1 to 1:25, the ratio of 1:25 being exclusive, characterized in that the void ratio of said stimulable phosphor-containing resin layer is not more than 85% of the void ratio of the stimulable phosphor-containing resin layer having the corresponding binder-phosphor ratio and formed by a coating procedure conducted under an atmospheric pressure.

There is also provided by the present invention a radiation image storage panel comprising a support and a stimulable phosphor-containing resin layer provided thereon which contains a resinous binder and a stimulable phosphor in a weight ratio of 1:25 to 1:100, characterized in that the void ratio of said stimulable phosphor-containing resin layer is not more than 90% of the void ratio of the stimulable phosphor-containing resin layer having the corresponding binder-phosphor ratio and formed by a coating procedure conducted under an atmospheric pressure.

The above-mentioned radiation image storage panels can be prepared by:

(1) a process which comprises:

subjecting a sheet comprising a support and a stimulable phosphor-containing resin layer provided theron which contains a resinous binder and a stimulable phosphor in a weight ratio of 1:1 to 1:25, the ratio of 1:25 being exclusive, or in a weight ratio of 1:25 to 1:100, and which has been formed by a coating procedure conducted under an atmospheric pressure on said support, to compression treatment so as to reduce the void ratio of the stimulable phosphor-containing resin layer to a value of not more than 85% or a value of not more than 90%, respectively, of the void ratio of the untreated stimulable phosphor-containing resin layer, or (2) a process which comprises:

subjecting a stimulable phosphor-containing resin layer which contains a resinous binder and a stimulable phosphor in a weight ratio of 1:1 to 1:25, the ratio of 1:25 being exclusive, or in a weight ratio of 1:25 to 1:100 and which has been formed by a coating procedure conducted under an atmospheric pressure, to compression treatment so as to reduce the void ratio of the stimulable phosphor-containing resin layer to a value of not more than 85% or a value of not more than 90%, respectively, of the void ratio of the untreated stimulable phosphor-containing resin layer, and providing thus treated stimulable phosphor-containing resin layer onto the support.

According to the present invention, a radiation image storage panel which provides an image of prominently improved sharpness can be obtained by reducing the void of the stimulable phosphor-containing resin layer to the above-defined extent in comparison with the void of the stimulable phosphor-containing resin layer containing the same resinous binder and stimulable phosphor in the same ratio which is formed by a coating procedure conducted under an atmospheric pressure.

More in detail, when a stimulable phosphor-containing resin layer comprising a stimulable phosphor and a resinous binder (referred to hereinafter as a phosphor layer) is formed on a support by an ordinary coating procedure conducted under an atmospheric pressure, air is apt to be introduced into the phosphor layer, whereby voids are produced therein. The voids are apt to be formed particularly in the vicinity of the phosphor particles. Further, as the ratio of the amount of the phosphor to that of the binder is increased, the phosphor particles is packed more densely, which results in formation of more voids in the phosphor layer.

When a radiation such as X-rays having passed through an object or having been radiated by an object enters a phosphor layer of a radiation image storage panel, phosphor particles contained in the phosphor layer absorb the radiation energy to record on the phosphor layer a radiation energy-stored image corresponding to the radiation energy having passed through or having been radiated by the object. Then, when an electromagnetic wave (stimulating rays) such as visible light or infrared rays impinges upon the radiation image storage panel, a phosphor particle having received the stimulating rays immediately emits light in the near ultraviolet to visible regions. The emitted light (of stimulated emission) enters directly a photosensor such as a photomultiplier moving close to the surface of the panel, in which the light is then converted to electric signals. Thus, the radiation energy-stored image in the panel is reproduced, for example, as a visible image.

The amount of the light emitted by the phosphor layer increases as the phosphor content in the phosphor layer is increased, and the increase thereof brings about enhancement of the sensitivity. On the other hand, the sharpness of the image is principally determined depending upon the thickness of the phosphor layer. More in detail, as the thickness of the phosphor layer increases, the stimulating rays is likely more diffused in the phosphor layer to excite not only the target phosphor particles but also the phosphor particles present outside thereof. Therefore, the resulting image (which is obtained by converting the emitted light to the electric signals and reproducing therefrom) decreases in the sharpness. Accordingly, the sharpness of the image can be improved by reducing the thickness of a phosphor layer.

According to the study of the present inventors, it has been discovered that the sharpness of the image can be prominently improved by reducing the void ratio of the phosphor layer of the radiation image storage panel to a level of not more than 85% (for a phosphor layer containing a binder and a stimulable phosphor in a ratio of 1:1 to 1:25, in which the ratio of 1:25 is not inclusive) or of not more than 90% (for a phosphor layer containing a binder and a stimulable phosphor in a ratio of 1:25 to 1:100) of the void ratio of the phosphor layer formed by a conventional coating procedure conducted under an atmospheric pressure and containing the same binder and stimulable phosphor in the same ratio. The phosphor layer having the reduced void ratio is more dense with the phosphor particles and therefore is thinner in the thickness than the phosphor layer produced under an atmospheric pressure, so that the radiation image storage panel having the void ratio-reduced phosphor layer provides an image distinctly improved in sharpness without decrease of the sensitivity thereof.

The radiation image storage panel of the present invention has, as described above, a phosphor layer containing stimulable phosphor particles with higher density as compared with that of the conventional radiation image storage panel. Accordingly, for instance, if the phosphor layer of the radiation image storage panel of the present invention is prepared to have the same thickness as that of the phosphor layer of the conventional one, the phosphor layer of the panel of the present invention necessarily contains phosphor particles in larger amount than the conventional one does. Thus, the radiation image storage panel of the present invention can bring about enhancement of the sensitivity without decrease of the sharpness of the image provided thereby. In other words, the radiation image storage panel of the present invention brings about higher sensitivity than the conventional radiation image storage panels providing an image of the same sharpness. Otherwise, the radiation image storage panel of the present invention provides an image of higher sharpness than the conventional radiation image storage panels exhibiting the same sensitivity does.

BRIEF DESCRIPTION OF THE DRAWINGS

In FIG. 1, A indicates a relationship between a spatial frequency and an MTF value in the case of using the radiation image storage panel of Example 1

(according to the present invention); and B indicates a relationship between a spatial frequency and an MTF value in the case of using the radiation image storage panel of Comparison Example 1 (conventional panel prepared by an ordinary coating procedure).

Figure 2:
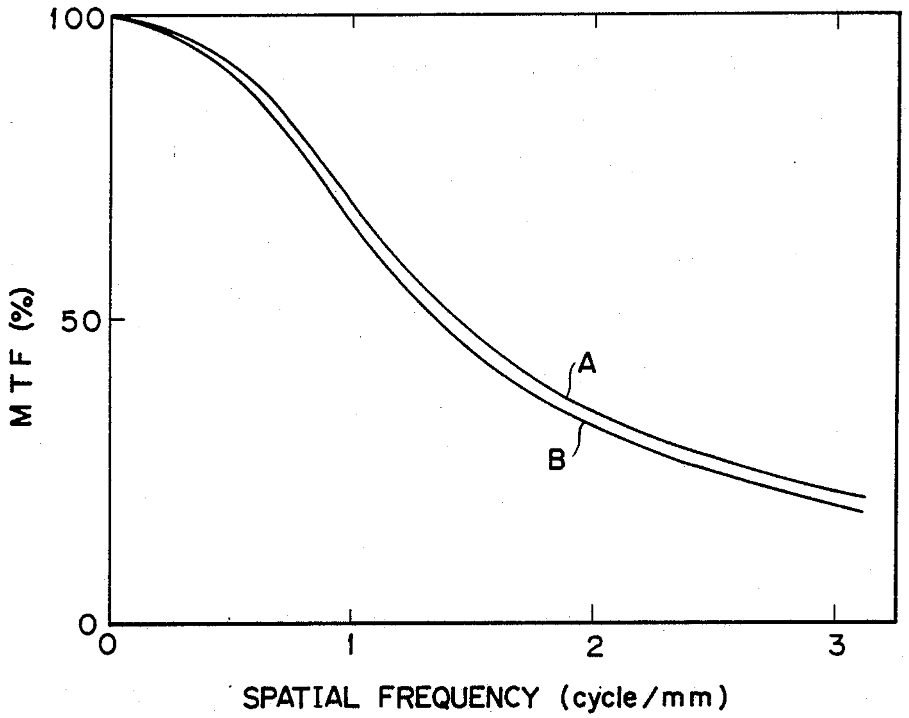

FIG. 2 also graphically illustrates MTF (Modulation Transfer Function) of the images provided by the radiation image storage panels of Example 9 and Comparison Example 3. In FIG. 2, A indicates a relationship between a spatial frequency and an MTF value in the case of using the radiation image storage panel of Example 9 (according to the present invention); and B indicates a relationship between a spatial frequency and an MTF value in the case of using the radiation image storage panel of Comparison Example 3 (conventional panel prepared by an ordinary coating procedure).

DETAILED DESCRIPTION OF THE INVENTION

The radiation image storage panel of the present invention having the above-described advantageous characteristics can be prepared, for instance, in the following manner.

The phosphor layer of the radiation image storage panel comprises a resinous binder and stimulable phosphor particles dispersed therein.

The stimulable phosphor, as described hereinbefore, gives stimulated emission when excited by stimulating rays after exposure to a radiation. In the viewpoint of practical use, the stimulable phosphor is desired to give stimulated emission when excited by stimulating rays in the wavelength region of 400–850 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO.xAl_2O_3$:Eu, in which x is a number satisfying the condition of $0.8 \leqq x \leqq 10$, and $M^{2+}O\ xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$, and xy=0, and a is a number satisfying the condition of $10^{-6} \leqq a \leqq 5\times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

$(Ba_{1-x}, M^{II}_x)FX$:yA, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in Japanese Patent Provisional Publication No. 55(1980)-12145;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5\times 10^{-5} \leqq x \leqq 0.5$ and $0 < y \leqq 0.2$, respectively, as described in Japanese Patent Provisional Publication No. 55(1980)-160078;

$(Ba_{1-x}, M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2\times 10^{-1}$, and $0 < z \leqq 10^{-2}$, respectively, as described in Japanese Patent Provisional Publication No. 56(1981)-116777;

$(Ba_{1-x},M^{II}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2\times 10^{-1}$, and $0 < z \leqq 2\times 10^{-1}$, respectively, as described in Japanese Patent Provisional Publication No. 57(1982)-23673;

$(Ba_{1-x}, M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2\times 10^{-1}$, and $0 < z \leqq 5\times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi;X is at least one element selected from the group consisting of Cl and Br; and x is a number satisfying the condition of $0 < x < 0.1$, as described in Japanese Patent Application No. 56(1981)-167498;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br, and I; and x and y are numbers satisfying the conditions of $10^{-2} \leqq x \leqq 0.5$ and $0 < y \leqq 0.1$, respectively, as described in Japanese Patent Application No. 57(1982)-89875;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0 < y \leqq 0.1$, respectively, as described in Japanese Patent Application No. 57(1982)-137374;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0 < y \leqq 0.1$, respectively, as described in Japanese Patent Application No. 57(1982)-158048;

$BaFX.xNaX':aEu^{2+}$, in which each of X and X' is at least one halogen selected from the group consisting of Cl, Br and I; and x and a are numbers satisfying the conditions of $0 < x \leqq 2$ and $0 < a \leqq 0.2$, respectively, as described in Japanese Patent Application No. 57(1982)-166320;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leqq 2$, $0 < y \leqq 0.2$ and $0 < z \leqq 10^{-2}$, respectively, as described in Japanese Patent Application No. 57(1982)-166696; and $M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \leqq 10^{-6}$; and x and y are numbers satisfying the conditions of $0 < x \leqq 0.5$ and $0 < y \leqq 0.2$, respectively, as described in Japanese Patent Application No. 57(1982)-184455.

The above-described stimulable phosphors are given by no means to restrict the stimulable phosphor employable in the present invention. Any other phosphors can be also employed, provided that the phosphor gives stimulated emission when excited with stimulating rays after exposure to a radiation.

Examples of the resinous binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copoymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the support, for instance, by the following procedure.

In the first place, phosphor particles and a resinous binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the resinous binder and the phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:85.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within a range of from 20 $\mu$m to 1 mm, preferably from 50 to 500 $\mu$m.

The phosphor layer can be provided onto the support by the methods other than that given in the above. For instance, the phosphor layer is initially prepared on a sheet material (false support) such as a glass plate, a metal plate or a plastic sheet using the aforementioned coating dispersion and then thus prepared phosphor layer is superposed on the genuine support by pressing or using an adhesive agent.

The support material employed in the present invention can be selected from those employed in the conventional radiogaphic intensifying screens. Examples of the support material include plastic films such as films of cellulose acetate, polyester, polyethylene terephthalate, polyamide, polymide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From a viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a higsharpness type radiation image storage panel, while the latter is appropriate for preparing a high-sensitivity type radiation image storage panel.

In the preparation of a known radiation image storage panel, one or more additional layers are occasionally provided between the support and the phosphor layer so as to enhance the adhesion between the support and the phosphor layer, or to improve the sensitivity of the panel or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided depending on the type of the radiation image storage panel to be obtained.

As described in Japanese Patent Application No. 57(1982)-82431 (which corresponds to U.S. patent application Ser. No. 496,278 and the whole content of which is described in European Patent Publication No. 92241), the phosphor layer side surface of the support (or the surface of an adhesive layer, light-reflecting layer, or light-absorbing layer in the case where such layers provided on the phosphor layer) may be provided with protruded and depressed portions for enhancement of the sharpness of radiographic image, and the constitution of those protruded and depressed portions can be selected depending on the purpose of the radiation image storage panel.

The void ratio of the stimulable phosphor-containing resin layer formed on the support in the manner as described above can be calculated theoretically by the following formula (I), $$\frac{Vair}{V} = \frac{(a+b)pxpy\,V - A(apy + bpx)}{V[(a+b)pxpy - apypair - bpxpair]} \qquad (I)$$

in which V is a total volume of the phosphor layer; Vair is a volume of air contained in the phosphor layer; A is a total weight of the phosphor; Px is a density of the phosphor; Py is a density of the binder; pair is a density of air; a is a weight of the phosphor; and b is a weight of the binder.

In the formula (I), pair is nearly 0. Accordingly, the formula (I) can be approximately rewritten in the form of the following formula (II):

$$\frac{Vair}{V} = \frac{(a+b)pxpy\,V - A\,(apy + bpx)}{V[(a+b)pxpy]} \qquad (II)$$

in which V, Vair, A, Px, Py, a and b have the same meanings as defined in the formula (I)

In the present invention, the void ratio of the phosphor layer is expressed by a value calculated according to the formula (II).

As an example, a procedure for formation of a phosphor layer comprising a divalent europium activated barium fluorobromide phosphor and a mixture of a linear polyester and nitrocellulose (serving as resinous binder) on a support is described below.

In the first place, a mixture of a linear polyester and nitrocellulose and divalent europium activated barium fluorobromide phosphor particles ($BaFBr:Eu^{2+}$) are mixed well in methyl ethyl ketone using a propeller agitater in such conditions that a ratio between the mixture and the phosphor is adjusted to 1:20 by weight, to prepare a coating dispersion having a viscosity of 30 PS (at 25° C.). The coating dispersion is applied evenly to a polyethylene terephthalate sheet (support) under an atmospheric pressure using a doctor brade. The support having the dispersion applied is then placed in an oven and heated at a temperature gradually increasing from 25° to 100° C., to form a phosphor layer on the support.

In one example, thus formed phosphor layer containing the binder and the phosphor in the ratio of 1:20 had a void ratio of 24.6%.

The same procedures as described above was repeated except that the ratio between the binder and the phosphor is replaced with a ratio of 1:10. The produced phosphor layer had a void ratio of 14.4%.

The same procedures as described above was repeated except that the ratio between the binder and the phosphor is replaced with a ratio of 1:40. The produced phosphor layer had a void ratio of 29.4%.

The same procedures as described above was repeated except that the ratio between the binder and the phosphor is replaced with a ratio of 1:80. The produced phosphor layer had a void ratio of 32.6%.

According to the study of the present inventors, it has been confirmed that the above-described phosphor layers are thought to be representative of those produced by the conventional coating procedure conducted under an atmospheric pressure. This means that the void ratio does not vary in a wide range even if other different binders, phosphor particles, or solvents are employed for the production of phosphor layers, provided that the ratio of the binder and the phosphor is kept at the same level. Further, in calculation of the void ratio according to the formula (II), additives incorporated into the coating dispersion can be neglected because these are added only in a small amount. Furthermore, the void ratio of a phosphor layer is not noticeably influenced by variation of coating conditions, so far as the coating procedure is carried out in a conventional manner under an atmospheric pressure.

Accordingly, as is evident from the above-mentioned formula (II), the void ratio of the phosphor layer varies principally by the ratio between the binder and the phosphor, that is, b:a, by weight, as difined in the formula (II). As the ratio of the phosphor particles to the binder in the phosphor layer is increased, an average distance between the phosphor particles dispersed in the binder becomes shorter, and voids are apt to be produced therebetween at a relatively high level. For this reason, the void ratio of the phosphor layer tends to increase when the content of the phosphor in the phosphor layer is increased.

In the process for the preparation of the radiation image storage panel of this invention, a part of air contained in the phosphor layer is subsequently removed to decrease the void. For instance, the void can be decreased by subjecting the phosphor layer to a compression treatment.

The compression treatment given to the phosphor layer is generally carried out at a temperature ranging from a room temperature to a temperature in the vicinity of the melting point of the binder contained in the phosphor layer and under a pressure ranging from 50 to 1500 kg./cm$^2$. Preferably, the compression treatment is carried out under heating. A compressing period is preferably within a range of from 30 sec. to 5 min. A preferred pressure is within a range of from 300 to 700 kg./cm². A temperature is determined depending upon the binder employed, and the temperature preferably is from 50° to 120° C.

Examples of the compressing apparatus for the compression treatment employable in the invention include known apparatus such as a calender roll and a hot press. For instance, a compression treatment using a calender roll involves moving a sheet consisting essentially of a support and a phosphor layer to pass through between two rollers heated at a certain temperature at a certain speed. A compression treatment using a hot press involves fixing the above-mentioned sheet between two metal plates heated to a certain temperature, and compressing the sheet from both sides up to a certain pressure for a certain period. The compressing apparatus employable in the invention is not restricted to the calender roll and hot press. Any other apparatus can be employed as far as it can compress a sheet such as the above-mentioned one under heating.

In the case where a phosphor-containing resin film is initially formed on a false support, the compression treatment can be applied to the film prior to providing the film onto a genuine support for a radiation image storage panel. In this case, the phosphor-containing resin film is subjected to the compression treatment singly or in the form of a sheet combined with the false support, and then the treated film is provided onto the genuine support.

The radiation image storage panel generally has a transparent film on a free surface of a phosphor layer to protect the phosphor layer from physical and chemical deterioration. In the radiation image storage panel of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approx. 3 to 20 μm.

In the case where the weight ratio between the binder and the phosphor is within a range of 1:1 to 1:25 (1:25 is not inclusive), the phosphor layer of the radiation image storage panel according to the present invention produced by the above-described representative method should have a void ratio of not more than 85% of that of the phosphor layer having the same ratio and produced by a conventional coating procedure conducted under an atmospheric pressure.

On the other hand, in the case where the weight ratio between the binder and the phosphor is within a range of 1:25 to 1:100, the phosphor layer of the radiation image storage panel according to the present invention produced by the above-described representative method should have a void ratio of not more than 90% of that of the phosphor layer having the same ratio and produced by a conventional coating procedure conducted under an atmospheric pressure.

As described above, the density of the phosphor contained in the phosphor layer of the radiation image storage panel becomes higher as the void ratio of the phosphor layer decreases. Accordingly, the phosphor layer can be made thinner, and the sharpness of the image provided by the panel can be prominently enhanced without decreasing the sensitivity thereof.

The following examples further illustrate the present invention, but these examples are by no means understood to restrict the invention.

EXAMPLE 1

A resinous binder mixture of a linear polyester resin and nitrocellulose (nitrification degree: 11.5%) and a particulate divalent europium activated barium fluorobromide stimulable phosphor ($BaFBr:Eu^{2+}$) were mixed in a ratio of 1:20 (binder:phosphor, by weight). To the mixture was added methyl ethyl ketone and the resulting mixture was stirred sufficiently by means of a propeller-agitator to prepare a coating dispersion containing homogeneously dispersed phosphor particles and having a viscosity of 30 PS (at 25° C.).

The coating dispersion was uniformly applied onto a polyethylene terephthalate sheet containing titanium dioxide (support, thickness; 250 μm) placed horizontally on a glass plate. The coating procedure was carried out using a doctor blade. The support having the applied coating dispersion was then placed in an oven and heated at a temperature gradually rising from 25° to 100° C. Thus, a sheet consisting of a support and a phosphor layer (thickness: approx. 300 μm) was prepared.

Subsequently, thus prepared sheet consisting of a support and a phosphor layer provided thereon was compressed under a pressure of 620 kg./cm² and at a temperature of 100° C. using a calendar roll.

On the phosphor layer of the support having been subjected to the compression treatment was placed a transparent polyethylene terephthalate film (thickness: 12 μm; provided with a polyester andhesive layer) to combine the transparent film and the phosphor layer through the adhesive layer.

Thus, a radiation image storage panel consisting essentially of a support, a phosphor layer and a transparent protective film was prepared.

EXAMPLE 2

The procedure of Example 1 was repeated except that the sheet consisting of a support and a phosphor layer was subjected to a compression treatment under a pressure of 420 kg./cm² and at a temperature of 100° C., to prepare a radiation image storage panel consisting essentially of a support, a phosphor layer and a transparent protective film.

EXAMPLE 3

The procedure of Exemple 1 was repeated except that the sheet consisting of a support and a phosphor layer was subjected to a compression treatment under a pressure of 620 kg./cm² and at a temperature of 80° C., to prepare a radiation image storage panel consisting essentially of a support, a phosphor layer and a transparent protective film.

EXAMPLE 4

The procedure of Exemple 1 was repeated except that the sheet consisting of a support and a phosphor layer was subjected to a compression treatment under a pressure of 420 kg./cm$^2$ and at a temperature of 80° C., to prepare a radiation image storage panel consisting essentially of a support, a phosphor layer and a transparent protective film.

COMPARISON EXAMPLE 1

The procedure of Example 1 was repeated except that the sheet consisting of a support and a phosphor layer was not subjected to compression treatment, to prepare a radiation image storage panel consisting essentially of a support, a phosphor layer and a transparent protective film.

The void ratio of the phosphor layer of the radiation image storage panel prepared in the manner as described above was calculated from the aforementioned formula (II) using a measured volume and weight of the phosphor layer, a density of the phosphor (5.1 g./cm$^3$) and a density of the binder (1.258 g./cm$^3$).

The results are set forth in Table 1.

TABLE 1

| | Pressure (kg./cm$^2$) | Temperature (°C.) | Void Ratio (%) | Relative Void Ratio (%) |
|---|---|---|---|---|
| Example 1 | 620 | 100 | 11.3 | 45.9 |
| 2 | 420 | 100 | 12.5 | 51.0 |
| 3 | 620 | 80 | 18.5 | 75.0 |
| 4 | 420 | 80 | 20.0 | 81.3 |
| Com. Example 1 | — | — | 24.6 | 100 |

The radiation image storage panels prepared as described above were evaluated on the sharpness of the image according to the following test.

The radiation image storage panel was exposed to X-rays at voltage of 80 KVp through an MTF chart and subsequently scanned with a He-Ne laser beam (wavelength: 632.8 nm) to excite the phosphor. The light emitted by the phosphor layer of the panel was detected and converted to the corresponding electric signals by means of a photosensor (a photomultiplier having spectral sensitivity of type S-5). The electric signals were reproduced by an image reproducing apparatus to obtain a visible image on a recording apparatus, and the modulation transfer function (MTF) value of the visible image was determined. The MTF value was given as a value (%) at the spacial frequency of 2 cycle/mm.

Figure 1:
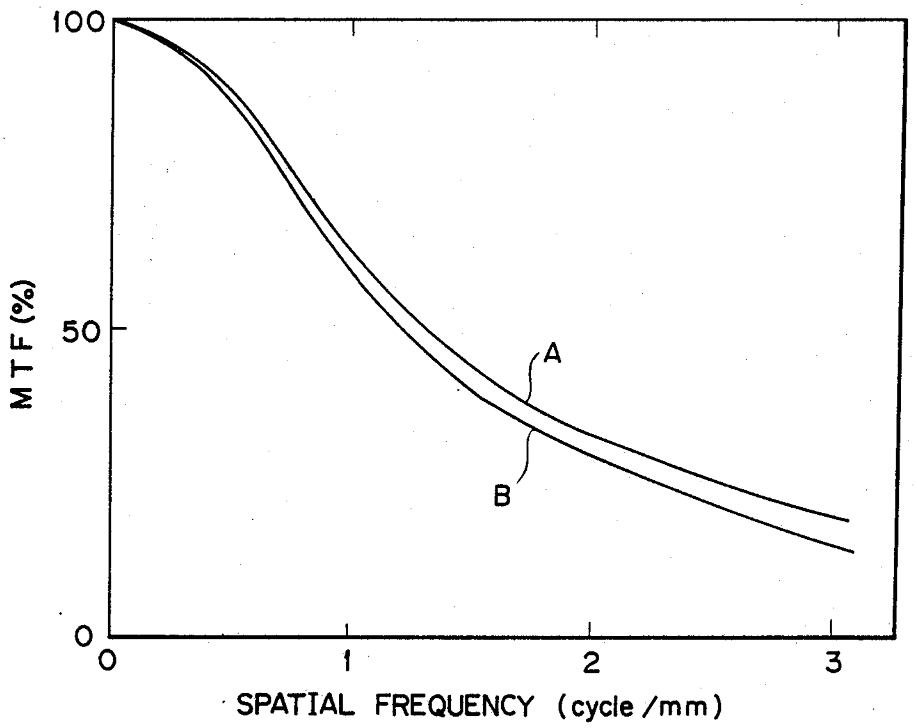
FIG. 1 graphically illustrates MTF (Modulation Transfer Function) of the images provided by the radiation image storage panels of Example 1 and Comparison Example 1.

The results are graphically illustrated in FIG. 1, in which:

Curve (A) indicates a relationship between a spatial frequency and an MTF value given in the case of using the radiation image storage panel of Example 1; and Curve (B) indicates a relationship between a spatial frequency and an MTF value given in the case of using the radiation image storage panel of Comparison Example 1.

The sharpness of the image given in the case of using each radiation image storage panel is set forth in Table 2 in terms of an MTF value determined at a spatial frequency of 2 cycle/mm.

TABLE 2

| | Sharpness (%) |
|---|---|
| Example 1 | 32 |
| 2 | 32 |
| 3 | 31 |
| 4 | 30 |
| Com. Example 1 | 29 |

EXAMPLE 5

The procedure of Examplè 1 was repeated except that the binder mixture of a linear polyester resin and nitrocellulose (nitrification degree: 11.5%) and the particulate divalent europium activated barium fluorobromide stimulable phosphor ($BaFBr:Eu^{2+}$) were mixed in a ratio of 1:10 (binder:phosphor, by weight), to prepare a radiation image storage panel consisting essentially of a support, a phosphor layer and a transparent protective film.

EXAMPLE 6

The procedure of Example 5 was repeated except that the sheet consisting of a support and a phosphor layer was subjected to a compression treatment under a pressure of 420 kg./cm$^2$ and at a temperature of 100° C., to prepare a radiation image storage panel consisting essentially of a support, a phosphor layer and a transparent protective film.

EXAMPLE 7

The procedure of Example 5 was repeated except that the sheet consisting of a support and a phosphor layer was subjected to a compression treatment under a pressure of 620 kg./cm$^2$ and at a temperature of 80° C., to prepare a radiation image storage panel consisting essentially of a support, a phosphor layer and a transparent protective film.

EXAMPLE 8

The procedure of Example 5 was repeated except that the sheet consisting of a support and a phosphor layer was subjected to a compression treatment under a pressure of 420 kg./cm$^2$ and at a temperature of 80° C., to prepare a radiation image storage panel consisting essentially of a support, a phosphor layer and a transparent protective film.

COMPARISON EXAMPLE 2

The procedure of Example 5 was repeated except that the sheet consisting of a support and a phosphor layer was not subjected to compression treatment, to prepare a radiation image storage panel consisting essentially of a support, a phosphor layer and a transparent protective layer.

The void ratio of the phosphor layer of the radiation image storage panel prepared in the manner as described above was calculated in the same manner as described hereinbefore.

The results are set forth in Table 3.

TABLE 3

| | Pressure (kg./cm$^2$) | Temperature (°C.) | Void Ratio (%) | Relative Void Ratio (%) |
|---|---|---|---|---|
| Example 5 | 620 | 100 | 6.6 | 45.8 |
| 6 | 420 | 100 | 7.2 | 50.2 |
| 7 | 620 | 80 | 10.5 | 73.2 |
| 8 | 420 | 80 | 11.0 | 76.3 |
| Com. Example 2 | — | — | 14.4 | 100 |

The radiation image storage panels prepared as described above were evaluated on the sharpness of the image according to the aforementioned test.

The sharpness of the image given in the case of using each radiation image storage panel is set forth in Table 4 in terms of an MTF value determined at a spatial frequency of 2 cycle/mm.

TABLE 4

| | Sharpness (%) |
|---|---|
| Example 5 | 29 |
| 6 | 29 |
| 7 | 27 |
| 8 | 27 |
| Com. Example 2 | 25 |

EXAMPLE 9

A resinous binder mixture of a linear polyester resin and nitrocellulose (nitrification degree: 11.5%) and a particulate divalent europium activated barium fluorobromide stimulable phosphor ($BaFBr:Eu^{2+}$) were mixed in a ratio of 1:40 (binder:phosphor, by weight). To the mixture was added methyl ethyl ketone and the resulting mixture was stirred sufficiently by means of a propeller agitater to prepare a coating dispersion containing homogeneously dispersed phosphor particles and having a viscosity of 30 PS (at 25° C.).

The coating dispersion was uniformly applied to a polyethylene terephthalate sheet containing titanium dioxide (support, thickness; 250 μm) placed horizontally on a glass plate. The coating procedure was carried out using a doctor blade. The support having the coating dispersion applied was then placed in an oven and heated at a temperature gradually rising from 25° to 100° C. Thus, a sheet consisting of a support and a phosphor layer (thickness: approx. 300 μm) was prepared.

Subsequently, thus prepared sheet consisting of a support and a phosphor layer provided thereon was compressed under a pressure of 620 kg./cm$^2$ and at a temperature of 100° C. using a calendar roll.

On the phosphor layer of the support having been subjected to the compression treatment was placed a transparent polyethylene terephthalate film (thickness: 12 μm; provided with a polyester andhesive layer) to combine the transparent film and the phosphor layer through the adhesive layer.

Thus, a radiation image storage panel consisting essentially of a support, a phosphor layer and a transparent protective film was prepared.

EXAMPLE 10

The procedure of Example 9 was repeated except that the sheet consisting of a support and a phosphor layer was subjected to a compression treatment under a pressure of 420 kg./cm$^2$ and at a temperature of 100° C., to prepare a radiation image storage panel consisting essentially of a support, a phosphor layer and a transparent protective film.

EXAMPLE 11

The procedure of Example 9 was repeated except that the sheet consisting of a support and a phosphor layer was subjected to a compression treatment under a pressure of 620 kg./cm$^2$ and at a temperature of 80° C., to prepare a radiation image storage panel consisting essentially of a support, a phosphor layer and a transparent protective film.

EXAMPLE 12

The procedure of Exemple 9 was repeated except that the sheet consisting of a support and a phosphor layer was subjected to a compression treatment under a pressure of 420 kg./cm$^2$ and at a temperature of 80° C., to prepare a radiation image storage panel consisting essentially of a support, a phosphor layer and a transparent protective film.

COMPARISON EXAMPLE 3

The procedure of Example 9 was repeated except that the sheet consisting of a support and a phosphor layer was not subjected to compression treatment, to prepare a radiation image storage panel consisting essentially of a support, a phosphor layer and a transparent protective film.

The void ratio of the phosphor layer of the radiation image storage panel prepared in the manner as described above was calculated from the aforementioned formula (II) using a measured volume and weight of the phosphor layer, a density of the phosphor (5.1 g./cm$^3$) and a density of the binder (1.258 g./cm$^3$).

The results are set forth in Table 5.

TABLE 5

| | Pressure (kg./cm$^2$) | Temperature (°C.) | Void Ratio (%) | Relative Void Ratio (%) |
|---|---|---|---|---|
| Example 9 | 620 | 100 | 17.7 | 60.2 |
| 10 | 420 | 100 | 19.3 | 65.5 |
| 11 | 620 | 80 | 23.5 | 80.0 |
| 12 | 420 | 80 | 26.0 | 88.4 |
| Com. Example 3 | — | — | 29.4 | 100 |

The radiation image storage panels prepared as described above were evaluated on the sharpness of the image according to the aforementioned test.

The results are graphically illustrated in FIG. 2, in which:

Curve (A) indicates a relationship between a spatial frequency and an MTF value given in the case of using the radiation image storage panel of Example 9; and Curve (B) indicates a relationship between a spatial frequency and an MTF value given in the case of using the radiation image storage panel of Comparison Example 3.

The sharpness of the image given in the case of using each radiation image storage panel is set forth in Table 6 in terms of an MTF value determined at a spatial frequency of 2 cycle/mm.

TABLE 6

| | Sharpness (%) |
|---|---|
| Example 9 | 34 |
| 10 | 34 |
| 11 | 33 |
| 12 | 33 |
| Com. Example 3 | 32 |

EXAMPLE 13

The procedure of Example 9 was repeated except that the binder mixture of a linear polyester resin and nitrocellulose (nitrification degree: 11.5%) and the particulated divalent europium activated barium fluorobromide stimulable phosphor ($BaFBr:Eu^{2+}$) were mixed in a ratio of 1:80 (binder:phosphor, by weight), to prepare a radiation image storage panel consisting essentially of a support, a phosphor layer and a transparent protective film.

EXAMPLE 14

The procedure of Example 13 was repeated except that the sheet consisting of a support and a phosphor layer was subjected to a compression treatment under a pressure of 420 kg./cm$^2$ and at a temperature of 100° C., to prepare a radiation image storage panel consisting essentially of a support, a phosphor layer and a transparent protective film.

EXAMPLE 15

The procedure of Example 13 was repeated except that the sheet consisting of a support and a phosphor layer was subjected to a compression treatment under a pressure of 620 kg./cm$^2$ and at a temperature of 80° C., to prepare a radiation image storage panel consisting essentially of a support, a phosphor layer and a transparent protective film.

EXAMPLE 16

The procedure of Example 13 was repeated except that the sheet consisting of a support and a phosphor layer was subjected to a compression treatment under a pressure of 420 kg./cm$^2$ and at a temperature of 80° C., to prepare a radiation image storage panel consisting essentially of a support, a phosphor layer and a transparent protective film.

COMPARISON EXAMPLE 4

The procedure of Example 13 was repeated except that the sheet consisting of a support and a phosphor layer was not subjected to compression treatment, to prepare a radiation image storage panel consisting essentially of a support, a phosphor layer and a transparent protective layer.

The void ratio of the phosphor layer of the radiation image storage panel prepared in the manner as described above was calculated in the same manner as described hereinbefore.

The results are set forth in Table 7.

TABLE 7

| | Pressure (kg./cm$^2$) | Temperature (°C.) | Void Ratio (%) | Relative Void Ratio (%) |
|---|---|---|---|---|
| Example 13 | 620 | 100 | 21.7 | 66.6 |
| 14 | 420 | 100 | 23.0 | 70.7 |
| 15 | 620 | 80 | 27.7 | 85.0 |
| 16 | 420 | 80 | 29.2 | 89.5 |
| Com. Example 4 | — | — | 32.6 | 100 |

The radiation image storage panels prepared as described above were evaluated on the sharpness of the image according to the aforementioned test.

The sharpness of the image given in the case of using each radiation image storage panel is set forth in Table 8 in terms of an MTF value determined at a spatial frequency of 2 cycle/mm.

TABLE 8

| | Sharpness (%) |
|---|---|
| Example 13 | 35 |
| 14 | 35 |
| 15 | 34 |
| 16 | 34 |
| Com. Example 4 | 33 |

I claim:

1. A radiation image storage panel comprising a support and a stimulable phosphor-containing resin layer provided thereon which contains a resinous binder and a stimulable phosphor in a weight ratio of binder to phosphor of 1:1 to 1:25 which is produced by the steps of:

forming a stimulable phosphor-containing resin layer on the support; and compressing the layer formed on the support to reduce voids in said layer to have a void ratio of not more than 85% of a void ratio of an uncompressed layer of stimulable phosphor-containing resin so that an image obtained from the compressed stimulable phosphor-containing resin layer in response to stimulation with a stimulating ray is sharper than an image obtained from the uncompressed stimulable phosphor-containing resin layer.

2. The radiation image storage panel as claimed in claim 1, in which said stimulable phosphor is a divalent europium activated alkaline earth metal fluorohalide phosphor.

3. The radiation image storage panel as claimed in claim 1, in which said stimulable phosphor is a divalent europium activated barium fluorobromide phosphor.

4. The radiation image storage panel as claimed in claim 1, in which the step for compressing is performed under a pressure of 50–1500 kg./cm$^2$, at a temperature of not lower than room temperature, but not higher than the melting point of the binder.

5. The radiation image storage panel as claimed in claim 1, in which said step for compressing is performed by means of a calender roll or a hot press.

6. A radiation image storage panel comprising a support and a stimulable phosphor-containing resin layer provided thereon which contains a resinous binder and a stimulable phosphor in a weight ratio of binder to phosphor of 1:1 to 1:25 which is produced by the steps of:

forming a stimulable phosphor-containing resin layer on a false support;

Compressing the layer formed on the false support to reduce voids in said layer to have a void ratio of not more than 85% of a void ratio of an uncompressed layer of stimulable phosphor-containing resin so that an image obtained from the compressed stimulable phosphor-containing resin layer in response to stimulation with stimulating ray is sharper than an image obtained from the uncompressed stimulable phosphor-containing resin layer; and transferring the compressed layer onto a geniune support to produce the radiation image storage panel.

7. The radiation image storage panel as claimed in claim 6 in which said stimulable phosphor is a divalent europium activated alkaline earth metal fluorohalide phosphor.

8. The radiation image storage panel as claimed in claim 6, in which said stimulable phosphor is a divalent europium activated barium fluorobromide phosphor.

9. The radiation image storage panel as claimed in claim 6, in which the step for compressing is performed under a pressure of 50–1500 kg./cm$^2$, and at a temperature of not lower than room temperature, but not higher than the melting point of the binder.

10. The radiation image storage panel as claimed in claim 6, in which the step for compressing is performed by means of a calender roll or a hot press.

11. A radiation image storage panel comprising a support and a stimulable phosphor-containing resin layer provided thereon which contains a resinous binder and a stimulable phosphor in a weight ratio of binder to phosphor of 1:25 to 1:100, which is produced by the steps of:

forming a stimulable phosphor-containing resin layer on the support; and compressing the layer formed on the support to reduce voids in said layer to have a void ratio of not more than 90% of a void ratio of an uncompressed layer of stimulable phosphor-containing resin so that an image obtained from the compressed stimulable phosphor-containing resin layer in response to stimulation with stimulating ray is sharper than an image obtained from the uncompressed stimulable phosphor-containing resin layer.

12. The radiation image storage panel as claimed in claim 11, in which said stimulable phosphor is a divalent europium activated alkaline earth metal fluorohalide phosphor.

13. The radiation image storage panel as claimed in claim 11, in which said stimulable phosphor is a divalent europium activated barium fluorobromide phosphor.

14. The radiation image storage panel as claimed in claim 11, in which the step for compressing is performed under a pressure of 50–1500 kg./cm$^2$, and at a temperature of not lower than room temperature, but not higher than the melting point of the binder.

15. The radiation image storage panel as claimed in claim 11, in which the step for compressing is performed by means of a calender roll or a hot press.

16. A radiation image storage panel comprising a support and a stimulable phosphor-containing resin layer provided thereon which contains a resinous binder and a stimulable phosphor in a weight ratio of binder to phosphor of 1:25 to 1:100, which is produced by the steps of:

forming a stimulable phosphor-containing resin layer on a false support;

compressing the layer formed on the false support to reduce voids in said layer to have a void ratio of not more than 90% of a void ratio of an uncompressed layer of stimulable phosphor-containing resin so that an image obtained from the compressed stimulable phosphor-containing resin layer in response to stimulation with a stimulating ray is sharper than an image obtained from the uncompressed stimulable phosphor-containing resin layer; and transferring the compressed layer onto a geniune support to produce the radiation image storage panel.

17. The radiation image storage panel as claimed in claim 16, in which said stimulable phosphor is a divalent europium activated alkaline earth metal fluorohalide phosphor.

18. The radiation image storage panel as claimed in claim 16, in which said stimulable phosphor is a divalent europium activated barium fluorobromide phosphor.

19. The radiation image storage panel as claimed in claim 16, in which the step for compressing is performed under a pressure of 50–1500 kg./cm$^2$, and at a temperature of not lower than room temperature, but not higher than the melting point of the binder.

20. The radiation image storage panel as claimed in claim 16, in which the step for compressing is performed by means of a calender roll or a hot press.

* * * * *

UNITED STATES PATENT AND TRADEMARK OFFICE
CERTIFICATE OF CORRECTION

PATENT NO. : 4,910,407

DATED : March 20, 1990

INVENTOR(S) : Satoshi Arakawa et al

It is certified that error appears in the above-identified patent and that said Letters Patent is hereby corrected as shown below:

On the title page after item [22] please insert the following:

Item [30] Foreign Appliacation Priority Data

January 8, 1983 [JP] ................. 58-1321
January 8, 1983 [JP] ................. 58-1322

Signed and Sealed this

Seventeenth Day of March, 1992

*Attest:*

HARRY F. MANBECK, JR.

*Attesting Officer*

*Commissioner of Patents and Trademarks*